United States Patent Office 3,224,985
Patented Dec. 21, 1965

3,224,985
ELASTOMERIC BLENDS OF AN ETHYLENE/1,4-HEXADIENE COPOLYMER AND A DIENE RUBBER
Edward K. Gladding, New Castle, and Jack L. Nyce, Newark, Del., assignors to E. I. du Pont de Nemours and Company, Wilmington, Del., a corporation of Delaware
No Drawing. Filed Nov. 19, 1962, Ser. No. 238,753
16 Claims. (Cl. 260—5)

This invention relates to an ozone-resistant, elastomeric vulcanizate and more particularly to an ozone-resistant vulcanizate prepared from a sulfur-curable blend of a conjugated diene rubber with an ethylene/1,4-hexadiene copolymer.

Diene rubbers, such as SBR, which have monomer units of at least one conjugated diene incorporated therein, are of great commercial importance today in the manufacture of a wide variety of useful products. Unfortunately, for applications where resistance to ozone is important, these diene rubbers leave much to be desired.

It is an object of the present invention to provide an ozone-resistant, elastomeric vulcanizate. A further object is to provide a blend of a conjugated diene rubber with an ethylene/1,4-hexadiene copolymer which blend may be readily cured with sulfur to provide an ozone-resistant vulcanizate. A still further object is to provide a process for preparing such a sulfur-curable blend as well as a process for curing said blend with sulfur. Other objects will appear hereinafter.

These and other objects of the present invention are accomplished by providing a sulfur-curable blend consisting essentially of (a) a stabilizing amount of an ethylene/1,4-hexadiene copolymer and (b) a diene rubber having monomer units of at least one conjugated diene incorporated therein; said ethylene copolymer having at least about 2.4 gram-moles of C=C groups per kilogram and exhibiting an inherent viscosity of at least 0.1 (measured on a 0.1 percent by weight solution in tetrachloroethylene at 30° C.). The novel blends of the present invention may be readily cured with sulfur so as to provide a vulcanizate which is unexpectedly highly resistant to ozone.

The heart of the present invention is the surprising discovery that the ozone resistance of a diene rubber vulcanizate can be greatly improved by incorporating prior to cure, an ethylene/1,4-hexadiene copolymer having a specified degree of unsaturation. An idea of the extraordinary improvement made possible by the present invention can be gained by noting that a sample of black-loaded SBR developed cracks within 15 minutes when subjected to 3 p.p.m. of ozone under static conditions at 100° F.; in contrast, a black-loaded blend made in accordance with the present invention was still uncracked after 508 hours exposure to ozone under the same conditions. When a black-loaded butadiene/acrylonitrile copolymer was subjected to dynamic flexing at 100° F. in the presence of 3 p.p.m. of ozone, cracks appeared within 20 minutes; in remarkable contrast, a blend of this diene rubber made in accordance with the present invention was uncracked after 60 hours treatment with ozone under the same conditions. A black-loaded Neoprene stock developed cracks after being flexed for 50 hours in the presence of 3 p.p.m. ozone at 100° F.; in striking contradistinction, a polychloroprene blend made according to the present invention was uncracked after being flexed for 204 hours under the same conditions.

The diene rubbers wich are employed in making the blends of the present invention are characterized by having at least about 20 mole percent conjugated diene monomer units incorporated in the polymer chain; frequently the diene concentration is over 50 mole percent. Representative examples of these rubbers include: natural rubber; butadiene-styrene rubbers (SBR); polychloroprenes (CR) such as Neoprene Type W, Neoprene Type WHV and Neoprene Type WRT; isoprene rubber (IR); butadiene rubber (BR); nitrile-butadiene rubbers (NBR); nitrile-chloroprene rubbers (NCR); vinyl pyridine-butadiene rubbers (PBR); styrene-chloroprene rubbers (SCR); styrene-isoprene rubbers (SIR). The nomenclature employed for describing these rubbers is taken from paragraph 4(a) of ASTM D 1418–58T, tentative recommended practice for nomenclature for synthetic elastomers and latices. Representative commercially available elastomers of this type and their suppliers are more particularly described in Compounding Ingredients for Rubbers, third edition, Cuneo Press of New England, Cambridge, Massachusetts, compiled by the editors of Rubber World, 630 Third Avenue, New York 17, New York, pages 555–591, 592, 595–608, 614–627. Diene polymers and copolymers are described also in Synthetic Rubber, G. S. Whitby, Editor-in-Chief, John Wiley & Sons, Inc., New York, 1954, Chapters 21, 22 and 23. Diene polymers and copolymers are also described in Introduction to Rubber Technology edited by M. Morton, Reinhold Publishing Corporation, New York, 1959, Chapters 3 (Natural Rubber), 10 (SBR), 11 (Nitrile Rubbers), and 13 (Neoprene). Further descriptions are contained in Synthetic Rubber Technology, Volume I, W. S. Penn, Maclaren and Sons, Ltd., London, 1960, Chapters 3 (SBR), 20 (Neoprene), and 28 (Nitrile Rubbers). Additional information is given in Rubber, Fundamentals of Its Science and Technology, J. LeBras, Chemical Publishing Company, Inc., New York, 1957, pages 288–289, 292, 294–314. Processes for making diene polymers are described in the patents tabulated in the review book Linear and Stereoregular Addition Polymers, N. G. Gaylord and H. F. Mark, Interscience Publishers, New York, 1959: pages 368–371 (polybutadiene), 372–375 (polyisoprene), 376–377 (chloroprene, dimethylbutadiene), 382–389 (α-olefin/conjugated diene copolymers), 390–391 (butadiene/isoprene copolymer) 398–399 (polybutadiene), 400–405 (polyisoprene), 406–407 and 454–455.

The preferred diene rubbers include natural rubber, SBR, NBR, cis-1,4-polybutadiene, cis-1,4-polyisoprene. The preferred SBR rubber contains about 54–97 weight percent butadiene monomer units; the particularly preferred SBR incorporates about 23.5 weight percent styrene units, has a Mooney (ML–4/100° C.) viscosity of about 46–54 and has a viscosity-average molecular weight of about 270,000. The particularly preferred polybutadienes have at least about 90 percent cis-1,4-units. These copolymers are more particularly described in U.S. Patents 2,913,444; 2,979,488 and 2,999,089; further processes for their preparation are given in German Patent 1,112,834. Polybutadiene containing a lower cis content and still suitable for use is described in U.S. Patents 2,908,672 and 2,908,673. The polyisoprene preferred is largely made up of 1,4-monomer units of which about at least 90 percent are cis. Preparation of these polymers is more particularly described in U.S. Patents 2,849,432; 2,856,391; 2,908,672; 2,908,673; 2,913,444; 2,977,349 and 2,979,494.

The ethylene/1,4-hexadiene copolymer which is incorporated into the above-described diene rubbers has at least about 2.4 gram-moles of C=C groups/kilogram and exhibits an inherent viscosity of at least 0.1 (measured on a 0.1 percent by weight solution in tetrachloroethylene at 30° C.). Ethylene/1,4-hexadiene copolymers having less than about 2.4 gram-moles of C=C groups/kilogram are less readily co-cured with the diene rubbers. Higher unsaturation is permissible and desirable for example, up to 6–7 gram-moles of carbon-carbon double bonds per kilogram of copolymer. The C=C content is determined by allowing bromine to react in the dark at 25° C. with a weighed copolymer sample, adding a potassium iodide solution, and determining the excess bromine by treating the liberated iodine with standard sodium thiosulfate. Potassium iodate is added, and the sample is again titrated to find the extent of substitution. The details are more particularly described hereinafter in the examples.

Ethylene/1,4-hexadiene copolymers are described in U.S. Patent 2,933,480. They are prepared in solution in inert solvents with coordination catalysts. The preferred catalyst used is prepared by mixing about one molar proportion of vanadium tris(acetylacetonate) with 7.5 molar proportions of diisobutyl aluminum chloride. The copolymer can also be made in the presence of catalysts prepared by mixing vanadyl chloride and organo aluminum compounds such as diisobutyl aluminum monochloride. The preferred concentration of vanadium in the copolymerization reaction zone ranges from about 0.0002 to 0.001 gram-atom per liter; however, it may be employed in higher or lower concentrations, if desired. The catalyst can be premixed; more frequently, it is formed in situ in the reaction zone. It is frequently preferred to introduce the catalyst after the hexadiene has been added to the reactor, but before the introduction of the highly reactive ethylene.

Representative solvents include halogenated hydrocarbons such as tetrachloroethylene, carbon tetrachloride, methylene chloride, ethyl chloride, and 1,2-dichloroethane; liquid paraffins and cycloparaffins such as pentane, cyclohexane, 2,2,4-trimethylpentane and n-octane; and aromatic hydrocarbons such as benzene, toluene, and mixed xylenes.

Since ethylene is by far the more reactive monomer used in making the copolymer, there is a tendency for the copolymer to contain an undesirably high ethylene monomer content; thus it is important to control its concentration in the reaction zone. When the reaction vessel has no free vapor space—that is, the reaction system is at all times full of liquid—the concentrations of monomers can be controlled merely by supplying the appropriate quantities of the monomers to a given volume of the reaction medium. When the reaction system has a vapor space, the monomer concentrations are controlled by their partial pressures in the the vapor space and by the reaction temperature. One can use an inert gaseous diluent such as nitrogen to reduce the partial pressure of ethylene; representative feed streams have 20–50 mole percent ethylene. One reduces the ethylene partial pressure until the desired copolymer composition results.

The operating temperature is an important feature of the process for making the ethylene/1,4-hexadiene copolymer. At temperatures above 75° C., the catalyst activity may be inconveniently short-lived. It is generally inconvenient to operate at temperatures below −30° C. because additional cooling equipment is required; furthermore, at temperatures much below −30° C., the reaction rate is undesirably reduced.

In a typical procedure for making the ethylene/1,4-hexadiene copolymers, a glass reaction vessel, equipped with a glass agitator, gas inlet and outlet tubes, and openings to permit the addition of liquid reagent, is charged under nitrogen with tetrachloroethylene which has been purified by drying over silica gel and being sparged with nitrogen. Agitation is started and the diene and vanadium tris(acetylacetonate) are added, in turn. After the mass has been cooled to the desired polymerization temperature, diisobutyl aluminum monochloride is introduced from a syringe through a serum cap at the top of the reactor. The nitrogen inflow is discontinued and a gaseous monomer feed stream is introduced at once, either above or below the surface of the solution in the reactor. The relative amounts of gas in this stream are controlled by suitably calibrated rotameters which are placed in the gas feed lines ahead of the mixing T. Prior to their introduction into the reactor, the gases are purified from oxygen, water vapor, and other contaminants reactable with aluminum alkyls by passage through a column of silica gel, 3 traps containing 20% triisobutyl aluminum in "Nujol" (a liquid petrolatum of specific gravity 0.88–0.90 at 60° F.), a trap containing "Nujol," and a column filled with silica gel. After the aluminum compound has been introduced, reaction occurs at once and a deep orange color appears which turns tan to brownish. The monomers are consumed and the temperature of the charge may rise unless external cooling is applied. During the reaction period, monomer gas flow is continued and excess gas is allowed to escape through the gas-outlet tube through a bubble-trap (filled with "Nujol" to prevent backflow of air). As the copolymerization proceeds, the charge becomes increasingly viscous and it is usually convenient to stop the reaction before the copolymer concentration exceeds about 5° by weight in tetrachloroethylene. The concentration of copolymer reaches about 1 to 5% by weight in about 10 to 80 minutes when the charge temperature ranges between about −10 to +25° C.

The copolymerization reaction is stopped by adding a low molecular weight alcohol such as isopropanol to the reaction mass to deactivate the catalyst. The amount of alcohol added is not critical, except that there should be at least one hydroxyl group introduced for every atom of metal in the reaction mixture. In a representative procedure, about one volume of alcohol is introduced for 100 volumes of a 5% reaction mixture. After the catalyst has been deactivated, the copolymer can be recovered by means familiar to those skilled in the art such as by evaporative distillation, drum drying, flash drying, and coagulation with a non-solvent such as alcohol. In one representative procedure, the copolymer solution is extracted with about an equal volume of dilute hydrochloric acid, washed with water until acid-free and introduced onto a hot rotating drum, the solvent being subsequently flashed off to leave a band of copolymer which is scraped from the drum by a doctor knife. In another typical procedure, the copolymers solution is mixed with an equal volume of a low molecular weight alcohol; the copolymer thereby coagulated is filtered off and washed, in turn, with fresh alcohol and twice with acetone. The copolymer can be dried in a vacuum oven or on a rubber roll mill. A non-volatile antioxidant such as 2,2'-methylenebis(6-tert-butyl-4- methylphenol) or 4,4'-thiobis(2-tert-butyl-5-methylphenol) is often incorporated prior to the final isolation step to avoid possible oxidation and degradation of the copolymer.

The sulfur-curable blends of the present invention consist essentially of the above-described diene rubber and a stabilizing amount of the ethylene/1,4-hexadiene copolymer. The stabilizing amount needed will vary depending upon the diene rubber, the type of filler (if used), the frequency and extent of dynamic flexing, the ozone concentration, etc. It has been observed that the blends of the present invention do not display a balance of the ozone resistance characteristics of the components. Instead, the blends behave in a very surprising manner. Introduction of a very small amount of ethylene copolymer (e.g. 5–10% by weight) frequently leaves the ozone resistance unchanged. Addition of slightly more (e.g. enough to give 15% by weight) may even slightly lower the resistance. When the blend contains about 25% copolymer by weight, the ozone resistance of its vulcanizates is frequently distinctly better than that of the vulcanizates of the diene rubber (e.g. time to cracking of 14 hours as against 45 minutes). An extraordinary and most unexpected increase in ozone resistance occurs when a further, usually small, addition of copolymer is made. Thus at equal clay loading, a vulcanizate of a natural rubber blend containing 25% ethylene copolymer cracked in 45 minutes when exposed unflexed to 3 p.p.m. ozone at 100° F., whereas a vulcanizate of a blend containing 35% ethylene copolymer was uncracked after 1000 hours ozone exposure under the same test conditions. A black-loaded vulcanizate of an SBR blend containing 25% ethylene copolymer cracked after 90 minutes under these ozone test conditions; in remarkable contrast, the corresponding vulcanizate of an SBR blend containing 35% by weight copolymer was uncracked after 1000 hours. Further illustrations are given in the examples, particularly Example 6. Preferred blends should contain about 30 to 50 percent by weight of the ethylene copolymer. A particularly preferred blend contains equal weights of the diene rubber and the ethylene copolymer. For most applications it does not appear to be necessary to employ more than about 75 percent by weight of the ethylene copolymer.

It is to be understood that the diene rubber may itself be a blend of two or more diene rubbers which are compatible with each other; thus, a representative composition of the present invention consists of 25 parts by weight of natural rubber, 25 parts by weight of SBR, and 50 parts by weight of the ethylene/1,4-hexadiene copolymer.

The copolymer/diene rubber blend can be prepared by any of the means customarily employed by those skilled in the rubber art. Thus, the components can be added to a rubber roll mill and mixed thereon or they can be blended in a Banbury mixer or they can be dissolved in appropriate solvents and mixed therein, the blend ultimately being obtained by removing the solvent by such conventional means as evaporative distillation, steam distillation, precipitation with a non-solvent for all components of the blend, and the like. The order of addition is optional with the operator. The blends are indefinitely stable and can be stored for as long a period as desired provided that they are maintained free from exposure to excessive heat, ultraviolet light, gas fumes, oxygen, and the like.

The compositions of the present invention can be very readily cured with sulfur to give vulcanizates displaying outstanding ozone resistance. Any of the procedures familiar to those skilled in the processing of natural rubber, butadiene/styrene rubber (SBR), Neoprene, and the other diene rubbers are suitable. In general, it is preferable to use a combination of sulfur, a metal oxide, and a vulcanization accelerator. In general, about 0.5 to 3.0 parts of sulfur per 100 parts by weight of the blend are employed; it is to be understood that larger or smaller concentrations may be used when deemed desirable. Zinc oxide and cadmium oxide are the preferred oxides; zinc oxide is particularly preferred because it is more efficient, lower in cost, and is less hazardous to use. The concentration of the metal oxide is important since it controls the ultimate state of cure in conjunction with sulfur and the accelerator. At concentrations of 3 to 10 parts by weight per 100 parts by weight of the blend, the rate and state of cure are very satisfactory as indicated by modulus, compression set, and elongation at break. Concentrations above 10 parts by weight are unnecessary. Concentrations below 3 parts are not satisfactory for developing and maintaining adequate vulcanizate properties.

The thiuram sulfides and dithiocarbamates are generally preferred because they produce rapid curing without attendant scorching and develop and maintain maximum physical properties even on extended curing cycles. Representative accelerators include: tetramethylthiuram monosulfide; tetramethylthiuram disulfide; the zinc salt of dimethyl dithiocarbamic acid; the piperidine salt of pentamethylene dithiocarbamic acid; N,N-diethylthiocarbamyl-2-mercaptobenzothiazole; 2-mercaptozoline; and 2-mercaptobenzothiazole.

The sulfur-curing system can be introduced into the components of the blend in a wide variety of ways. For example, the blend can be prepared and the curing agents subsequently added. Alternatively, the curing agents can be added to one or both of the components of the blend and these mixtures then blended to give the curable composition. In still another procedure, the curing agent can be introduced into the ethylene copolymer, this composition can be blended with the diene rubber and the resulting composition can be compounded with additional sulfur-curing agents. Other alternatives will be obvious to those skilled in the art.

It is understood that various modifications of the sulfur curing procedure may be employed depending upon the stock. Various procedures and modifications of sulfur curing are more particularly described in Encyclopedia of Chemical Technology, Kik and Othmer, published by Inter-Science Encyclopedia, Inc., New York, 1953, 11, pages 892–927; Principles of High-Polymer Theory and Practice, Schmidt and Marlies, published by McGraw-Hill Book Co., New York, 1948, pages 556–566; Chemistry and Technology of Rubber, Davis and Blake, published by Reinhold Publishing Corp., New York, 1937, Chapter 6; Introduction to Rubber Technology, edited by M. Morton, Reinhold Publishing Corp., New York, 1959, pages 93–129; The Applied Science of Rubber, edited by W. J. S. Naunton, Edward Arnold, Ltd., London, 1961, pages 346–413, 992–1099.

Vulcanization is accomplished by heating the compounded blend (usually in a mold) at a temperature ranging between 130° to 160° C. for a period of time ranging from about 10 to 90 minutes; it is often preferred to cure the blend at 160° for about 30 minutes. The time and temperature required will depend somewhat upon the nature of the diene rubber and its proportion in the blend. Those skilled in the art can determine the best time and temperature to use by empirical experiments. The state of cure is best determined by the value of the modulus at 300% extension and the compression set at elevated temperature for example 70 to 100° C.

It is to be understood that the compositions of the present invention can be vulcanized by the use of sulfur-bearing compounds which make the sulfur available under curing conditions. As is well known to those skilled in the art, representative examples of these compounds have bridges containing two or more sulfur atoms, e.g. disulfide groups and tetrasulfide groups. Tetralkylthiuram disulfides, e.g. tetramethylthiuram disulfide, tetraethyl thiuram disulfide, and dipentamethylene thiuram tetrasulfide, are valuable compounds of this type. Dithiocarbamates, such as selenium dimethyl dithiocarbamate and selenium diethyl dithiocarbamate, and 4,4'-dithiodimorpholine are additional examples of useful compounds. Accelerators such as tetramethylthiuram monosulfide, can also be present during the cure. The concentration of sulfur-bearing compound will be determined by empirical experiments for a particular application by those skilled in the art. A typical range includes 1 to 6 phr. Further information is given in literature such as the following: Vanderbilt Rubber Handbook, R. T. Vanderbilt Company, 230 Park Avenue, New York, New York, 1958, pages 159, 172–173, 179, 240, 249; Chemistry of Natural and Synthetic Rubbers, H. L. Fisher, Reinhold Publishing Corporation, New York, 1957, pages 30–31; The Applied Science of Rubber, pages 400, 1044–1048; Rubber, Fundamentals of Its Science and Technology, page 171; Synthetic Rubber Technology, pages 27–28, 240–241; Bulletin BL–316, Tetrone A, Elastomers Division, E. I. du Pont de Nemours and Co. (Inc.), Wilmington 98, Delaware; 1959 Catalogue of Du Pont Elastomers and Chemicals, Elastomer Chemicals Department, E. I. du Pont de Nemours and Co. (Inc.), Wilmington 98, Delaware, pages 34, 36 and 37.

In addition to the above-described curing additives, conventional fillers and pigments may be added. The amount of filler to be used will depend upon the particular application desired and can be varied by those skilled in the art according to empirical observations. About 20 to 70 parts of carbon black are frequently supplied for each 100 parts by weight of the blend in order to obtain vulcanizates of higher modulus and tensile strength. Furnace process carbons are preferred for reinforcing the blend. Stocks containing channel black give comparable tensile strength but lower modulus. High abrasion furnace black (HAF) or super abrasion furnace black (SAF) are the preferred carbon blacks. Thermal carbons can be used but provide a low order of reinforcement. MT black is a representative example of this type. Fillers other than carbon black can be used such as fine particle silicas, esterified silica, titanium dioxide, hard and soft kaolin clays, fine particle talc, calcined kaolin clay, blanc fixe, and whiting. About 80 to 200 parts of mineral filler per 100 parts by weight of the blend is frequently used.

The blend of the present invention can be oil extended. Thus one can make normally solid mixtures comprising (A) the blend of the present invention and (B) a petroleum oil having a flash point of at least about 300° F. and a viscosity gravity (in the range 0.80 to 1.0). As is well known to those skilled in the art, the viscosity-gravity constant of a particular petroleum oil can be easily used to classify the oil as paraffinic, relatively paraffinic, naphthenic, relatively aromatic, aromatic, very aromatic or extremely aromatic. The more aromatic the oil, the higher the viscosity-gravity constant. The particularly preferred oils are the intermediate types called relatively paraffinic, naphthenic and relatively aromatic having viscosity-gravity constants in the range of about 0.820–0.949.

The petroleum oil can be introduced into either of the components of the blend before they are mixed or can be introduced into the blend itself. The petroleum oil can be introduced into the dry polymer stock and in a Banbury mixer or on a rubber roll mill, prior to cure, or it can be added to a polymer solution prior to removal of the solvent or it can be mixed with a polymer slurry before the latter reaches an extruder drier or it can be added to copolymer crumbs obtained by washing a slurry, the oil-crumb dispersion then being sent to an extruder drier. Oil extension of loaded stocks such as clay or black stocks, is also possible. Those skilled in the art can vary the amount of oil to suit a particular application. The oil concentration can range typically from 1 to 300 parts per 100 parts by weight of the total blend.

The following examples will better illustrate the nature of the present invention; however the invention is not intended to be limited to these examples. Parts are by weight unless otherwise indicated.

EXAMPLE 1

A. *Preparation of ethylene/1,4-hexadiene copolymer*

The ethylene/1,4-hexadiene copolymer was prepared continuously at atmospheric pressure in a 3.75-liter reaction vessel. A purified monomer blend supplying 2.5 liters per minute apiece of ethylene and nitrogen (per liter of solution in the reaction vessel) was introduced continuously throughout the reaction. The coordination catalyst was pre-mixed at 25° C. in tetrachloroethylene in the presence of 1 molar 1,4-hexadiene monomer. After a residence time of about 1 minute the catalyst/diene stream was introduced into the agitated reactor. In the reaction vessel the vanadium concentration was 0.001 molar, the aluminum concentration was 0.0086 molar, the 1,4-hexadiene concentration was 1.0 molar, the temperature was 0° C., the pressure was atmospheric, and the residence time was 25 minutes. The reactor effluent, containing 32 grams of copolymer per liter, was treated once with an equal volume of 0.5 percent by weight sulfuric acid, and three times with equal volumes of water. After 0.5 percent 4,4'-thiobis(2-tertiary-butyl-5-methylphenol) antioxidant (by weight of copolymer) had been added to the solution, the tetrachloroethylene solvent was removed on a drum drier. The copolymer obtained had a density of 0.89 gram/cc., a Mooney viscosity (ML–4/100° C.) of 24, an inherent viscosity of 1.30 (measured on a 0.1 percent by weight solution in tetrachloroethylene at 30° C.) and contained about 4.3 gram-mole 1,4-hexadiene/kilogram (about 70 percent of which had side-chain unsaturation).

The side-chain unsaturation was determined by the following procedure:

Twenty-five milliliters of a solution of 5 ml. bromine in one liter of $CCl_4$ is added to a solution of copolymer in 50 ml. of $CCl_4$ at 25° C. The flask is stoppered, covered with a few ml. of 25% aqueous KI, and placed in the dark for two hours at 25° C. Then, the KI solution and about 25 ml. of additional 25% aqueous KI are introduced. The resulting mixture is titrated to a starch end point with 0.1 N sodium thiosulfate. (If it appears that emulsification of the solvent will obscure the end point, 75 ml. of 10% aqueous NaCl are added during the titration.) Then, 5 ml. of aqueous $KIO_3$ (made by dissolving 25 grams $KIO_3$ in one liter of water) are added, and the mixture is again titrated with 0.1 N sodium thiosulfate. A blank is run by repeating the above procedure without the copolymer.

The C=C concentration is determined by subtracting the bromine consumed by substitution in the copolymer from the total bromine consumed by reaction with the copolymer. The $$\text{total bromine (moles/kg.)} = \frac{(B-T)0.1}{2 \text{ (grams of copolymer)}}$$

where B=ml. 0.1 N sodium thiosulfate used to 1st end point (before $KIO_3$ addition) of blank solution
T=ml. 0.1 N sodium thiosulfate used to 1st end point (before $KIO_3$ addition) of copolymer solution The bromine consumed by substituted (moles/kg.) =

$$\frac{[(M-H)]0.1}{\text{(Grams of Copolymer)}}$$

where
M=ml. 0.1 sodium thiosulfate added after $KIO_3$ solution introduced into copolymer solution
H=ml. 0.1 sodium thiosulfate added after $KIO_3$ solution introduced into blank solution

B. *SBR–1500*

The diene rubber was a copolymer consisting of the following monomer units: 86.9 mole percent (76.5 weight percent) butadiene and 13.1 mole percent (23.5 weight percent) styrene. It exhibited an intrinsic viscosity in toluene of about 2.09 corresponding to a viscosity-average molecular weight of about 270,000. Its density at 25° C. was about 0.94 gram/cubic centimeter. The Mooney viscosity of the raw copolymer four minutes after operation of the larger rotor at 100° C. was about 50–52.

C. *Preparation of elastomer blend*

An elastomer composition was prepared on a rubber roll mill according to the following recipe:

| Component: | Parts by weight |
|---|---|
| Ethylene/1,4-hexadiene copolymer | 50 |
| SBR–1500 | 50 |
| HAF black | 50 |
| N-phenyl-β-naphthylamine | 1 |
| Stearic acid | 1 |
| Zinc oxide | 1 |
| 2-mercaptothiazole | 2.0 |
| Sulfur | 1.2 | and heated at 160° C. in a press for 60 minutes. The vulcanizate obtained displayed the following properties:

| | |
|---|---|
| $M_{300}$(p.s.i.) | 1,910. |
| Tensile strength (p.s.i.) | 2,900. |
| Extension at break (percent) | 500. |
| Yerzley resilience (percent) | 47.8. |
| Shore A hardness | 70. |
| Compression set (70 hrs./100° C. percent) | 63. |
| Static ozone (508 hrs./3 p.p.m.; 100° F.) | No cracks. |
| Dynamic flexing (204 hrs./3 p.p.m.; 100° F.) | No cracks. |

D. *Control experiment*

An experiment was run outside the scope of the present invention for comparison purposes in which the procedure of Part C above was repeated except that no ethylene copolymer was used, the amount of SBR–1500 was increased to 100 parts and the sulfur concentration was increased to 1.5 parts. The vulcanizate obtained exhibited the following properties:

| | |
|---|---|
| $M_{300}$(p.s.i.) | 1,700. |
| Tensile strength (p.s.i.) | 3,680. |
| Extension at break (percent) | 520. |
| Yerzley resilience (percent) | 46.5. |
| Shore A hardness | 63. |
| Compression set (70 hrs./100° C. percent) | 63. |
| Static ozone | Cracks after 15 min. |
| Dynamic flexing | Cracks after 20 min. |

EXAMPLE 2

A. *Ethylene/1,4-hexadiene copolymer*

The ethylene/1,4-hexadiene copolymer employed was that described in Part A of Example 1 above.

B. *Butadiene/acrylonitrile copolymer*

The diene rubber employed was a butadiene/acrylonitrile copolymer having a medium high acrylonitrile content and stabilized with the antioxidant "Age Rite Stalite" (a mixture of octylated diphenylamines). The copolymer has a specific gravity of 0.98 and a Mooney viscosity (ML–4/100° C.) of 70–95.

C. *Preparation of sulfur-curable blend*

The ethylene copolymer and the butadiene/acrylonitrile copolymer were separately compounded on a rubber roll mill according to the following recipe:

| Component | Parts by weight |
|---|---|
| Elastomer | 100 |
| HAF black | 50 |
| Zinc oxide | 5 |
| Stearic acid | 1 |
| N-phenyl-β-naphthylamine | 1 |
| 2,2'-dithiobisbenzothiazole | 1.25 |
| Sulfur: | |
|    Butadiene/acrylonitrile copolymer | 1.25 |
|    Ethylene copolymer | 1.00 |

Equal weights of these stocks were blended together to give a compounded blend having 50 parts by weight of the ethylene copolymer, 50 parts by weight of the butadiene/acrylonitrile copolymer and the curing aids described above. This blended stock was then cured at 160° C. for 60 minutes. The vulcanizate obtained displayed the following properties:

| | |
|---|---|
| $M_{200}$ (p.s.i.) | 2150. |
| Tensile strength (p.s.i.) | 2780. |
| Extension at break (percent) | 280. |
| Yerzley resilience (percent) | 47.6. |
| Shore A hardness | 78. |
| Compression set (70 hrs./100° C. percent) | 32. |
| Dynamic flexing (3 p.p.m. ozone, 100 F., 60 hrs.) | No cracks. |

D. *Control experiment*

A composition containing no ethylene copolymer was tested for comparison purposes. The butadiene/acrylonitrile copolymer stock made above was heated at 160° C. for 60 minutes. The vulcanizate obtained displayed the following properties:

| | |
|---|---|
| $M_{200}$ (p.s.i.) | 2000. |
| Tensile strength (p.s.i.) | 3170. |
| Extension at break (percent) | 270. |
| Yerzley resilience (percent) | 47.5. |
| Shore A hardness | 74. |
| Dynamic flexing | Cracks within 20 min. |
| Compression set (percent) | 28. |

EXAMPLE 3

A. *Ethylene/1,4-hexadiene copolymer*

The ethylene/1,4-hexadiene copolymer described in Part A of Example 1 above was employed.

B. *Polychloroprene*

The chloroprene polymer employed was a polymer of 2-chloro-1,3-butadiene prepared by emulsion polymerization at 40° C. using a free radical catalyst. This polymer has a specific gravity of 1.23.

C. *Preparation and cure of a 50/50 blend of ethylene/1,4-hexadiene copolymer and polychloroprene*

The ethylene/1,4-hexadiene copolymer and the polychloroprene were separately compounded on a rubber roll mill according to the following recipes:

| Component | A | B |
|---|---|---|
| Ethylene/1,4-hexadiene copolymer | 0 | 100 |
| Polychloroprene | 100 | 0 |
| HAF Black | 20 | 50 |
| N-phenyl-β-naphthylamine | 0 | 1 |
| N-phenyl-α-naphthylamine | 2 | 0 |
| Magnesium oxide | 4 | 0 |
| Zinc oxide | 5 | 5 |
| Stearic acid | 0 | 1 |
| Di-o-tolylguanidine | 0.5 | 0 |
| Tetramethylthiuram monosulfide | 0.5 | 0.75 |
| Sulfur | 1.0 | 0.5 |

Equal weights of these stocks were then blended on a rubber roll mill to give a composition described by the following recipe:

| Component: | Parts by weight |
|---|---|
| Ethylene/1,4-hexadiene copolymer | 50 |
| Polychloroprene | 50 |
| HAF black | 35 |
| N-phenyl-β-naphthylamine | 0.5 |
| N-phenyl-α-naphthylamine | 1.0 |
| Magnesium oxide | 2 |
| Zinc oxide | 5 |
| Stearic acid | 0.5 |
| Di-o-tolylguanidine | 0.25 |
| Tetramethylthiuram monosulfide | 0.62 |
| Sulfur | 0.75 |

The compounded stock was cured at 160° C. for 60 minutes in a press. The vulcanizate obtained exhibited the following properties:

| | |
|---|---|
| $M_{200}$ (p.s.i.) | 2240. |
| Tensile strength (p.s.i.) | 3190. |
| Extension at break (percent) | 270. |
| Yerzley resilience (percent) | 56.6. |
| Shore A hardness | 78. |
| Compression set (70 hrs./100° C. percent) | 36. |
| Dynamic flexing (3 p.p.m. ozone, 209 hrs. at 100° F.) | No cracks. |

D. *Control experiment*

A control was run containing no ethylene copolymer for purposes of comparison. The compounded polychloroprene stock described above, was cured for 60 minutes at 160° C. in a press. The vulcanizate obtained displayed the following properties:

| | |
|---|---|
| $M_{200}$ (p.s.i.) | 2510. |
| Tensile strength (p.s.i.) | 3710. |
| Extension at break (percent) | 280. |
| Yerzley resilience (percent) | 65.9. |
| Shore A hardness | 72. |
| Compression set (percent) | 39. |
| Dynamic flexing | Cracks within 50 hours. |

EXAMPLE 4

Natural rubber smoked sheet and the ethylene/1,4-hexadiene copolymer of Example 1 were separately compounded on a rubber roll mill according to the following recipe:

| Component: | Parts by weight |
|---|---|
| Elastomer | 100 |
| HAF black | 50 |
| Zinc oxide | 3 |
| N-phenyl-β-naphthylamine | 1 |
| Stearic acid | 4 |
| 2-mercaptobenzothiazole | 1 |
| Sulfur | 3 | to give Stocks A and B, respectively. Portions of B were blended with A on a rubber roll mill to give compounded stocks C, D, and E in which the ethylene/1,4-hexadiene copolymer content amounted to 25, 50 and 75 percent by weight of the elastomer component.

After stocks A–E had been cured at 130° C. for 90 minutes, the resulting vulcanizates were exposed under static conditions for 68 hours at 38° C. to an atmosphere having an ozone concentration of one part per million. The following results occurred:

| | Stock | | | | |
|---|---|---|---|---|---|
| | A | C | D | E | B |
| Percent Copolymer | 0 | 25 | 50 | 75 | 100. |
| Bent loop appearance | Severely cracked. | Slightly cracked. | No cracks. | No cracks. | No cracks. |

EXAMPLE 5

The SBR and ethylene/1,4-hexadiene copolymer of Example 1 were separately compounded on a rubber roll mill according to the following recipe:

| Component: | Parts by weight |
|---|---|
| Elastomer | 100 |
| HAF black | 50 |
| Zinc oxide | 5 |
| N-phenyl-β-naphthylamine | 1 |
| Stearic acid | 1 |
| Piperidinium pentamethylene-dithiocarbamate | 1.76 |
| Sulfur | 0.6 | to give stocks A and B respectively. Portions of B were blended with A on rubber roll mill to give compounded stocks C, D, and E in which the ethylene/1,4-hexadiene copolymer content amounted to 25, 50 and 75 percent by weight of the elastomer component.

After stocks A–E had been cured at 160° C. for 30 minutes, the resulting vulcanizates were exposed under static conditions for 68 hours at 38° C. to an atmosphere having one part per million ozone concentration. The following results occurred:

| | Stock | | | | |
|---|---|---|---|---|---|
| | A | C | D | E | B |
| Percent Copolymer | 0 | 25 | 50 | 75 | 100. |
| Bent loop appearance | Severely cracked. | Very slightly cracked. | No cracks. | No cracks. | No cracks. |

EXAMPLE 6

A. *Ethylene/1,4-hexadiene copolymer*

The ethylene/1,4-hexadiene copolymer employed was made in accordance with the procedure given in Example 1. It had an inherent viscosity of 1.39 (measured on a 0.1 percent by weight solution in tetrachloroethylene at 30° C.), exhibited a Wallace plasticity of 15.9 and contained about 4.2 gram-mole of 1,4-hexadiene monomer units/kilogram (corresponding to about 2.84 gram-mole of C=C/kilogram).

B. *SBR–1500*

The SBR–1500 described in Example 1B was used.

C. *Butadiene/acrylonitrile copolymer*

The copolymer described in Example 2B was used.

D. *Cis-1,4-polybutadiene*

The polymer employed had an inherent viscosity at 30° C. (0.1% by weight solution in tetrachloroethylene at 30° C.) of 2.48 and a Mooney viscosity (ML–4/100° C.) of 44.

E. *Preparation of sulfur-curable blends*

(1) Black stocks were separately compounded on a rubber roll mill according to the following recipes:

A. ETHYLENE/1,4-HEXADIENE COPOLYMER

| Component: | Parts by weight |
|---|---|
| Copolymer | 100 |
| HAF Black | 50 |
| Zinc oxide | 5 |
| Stearic Acid | 1 |
| 2,2'-dithiobisbenzothiazole | 1 |
| Tetramethylthiuram disulfide | 1 |
| Sulfur | 0.5 |

B. NATURAL RUBBER

| Component: | |
|---|---|
| Smoked sheet | 100 |
| HAF black | 50 |
| Zinc oxide | 5 |
| Stearic acid | 2 |
| N-phenyl-β-naphthylamine | 0.5 |
| 4,4'-dimethoxydiphenylamine | 0.25 |
| N,N'-diphenyl-p-phenylenediamine | 0.25 |
| 2,2'-dithiobisbenzothiazole | 1 |
| diphenylamine/acetone condensation product | 1 |
| Tetramethyl thiuram disulfide | 0.25 |
| Sulfur | 2.5 |

C AND D. SBR–1500 AND POLYBUTADIENE

Natural rubber recipe except:
| Tetramethylthiuram disulfide | 0.5 |
|---|---|
| Sulfur | 2 |

E. BUTADIENE/ACRYLONITRILE COPOLYMER

| Component: | Parts by weight |
|---|---|
| Copolymer | 100 |
| HAF black | 50 |
| Zinc oxide | 5 |
| Stearic acid | 1 |
| N-phenyl-β-naphthylamine | 2 |
| Nickel dibutyl dithiocarbamate | 2 |
| 2,2'-dithiobisbenzothiazole | 1.5 |
| Tetramethylthiuram disulfide | 0.25 |
| Sulfur | 1.5 |

Stocks A to E above prepared were then blended on a rubber roll mill at 75–100° F. to give stocks containing various amounts of ethylene copolymer. These stocks were press cured for 30 minutes; the temperature was 292° F. for the natural rubber stocks, 307° F. for the rest.

The resulting vulcanizates were exposed to ozone at 100° F. under both static and dynamic conditions. The results are reported in the table at the end of this example.

(2) Clay stocks were separately compounded on a rubber roll mill according to the following recipes:

A. ETHYLENE/1,4-HEXADIENE COPOLYMER

| Component: | Parts by weight |
|---|---|
| Copolymer | 100 |
| Kaolin clay | 100 |

C AND D. SBR AND POLYBUTADIENE

Natural rubber recipe except:

| | Parts by weight |
|---|---|
| Zinc dimethyl dithiocarbamate | 0.5 |
| Sulfur | 2 |

E. BUTADIENE/ACRYLONITRILE COPOLYMER

| Component: | Parts by weight |
|---|---|
| Copolymer | 100 |
| Kaolin clay | 100 |
| Zinc oxide | 5 |
| Stearic acid | 1 |
| Antioxidant (see NR above) | 1.5 |
| Nickel dibutyl dithiocarbamate | 2 |
| 2,2'-dithiobisbenzothiazole | 1.5 |
| Zinc dimethyl dithiocarbamate | 0.5 |
| Sulfur | 1.5 |

Stocks A to E prepared above were then blended on a rubber roll mill at 75–100° F. to give stocks containing various amounts of ethylene copolymer. These stocks were then press cured: natural rubber, 40 minutes at 292° F.; rest, 30 minutes at 307° F.

The resulting vulcanizates were exposed to ozone at 100° F. under both static and dynamic conditions. The following results were obtained:

*Ozone cracking time of vulcanizates of diene/ethylene copolymer blends*

| Stock | Diene Rubber | Percent Ethylene Copolymer | Black Stocks | | | Clay Stocks | | |
|---|---|---|---|---|---|---|---|---|
| | | | 0.5 p.p.m. O₃ Dynamic | 1 p.p.m. O₃ Static | 3 p.p.m. O₃ Static | 0.5 p.p.m. O₃ Dynamic | 1 p.p.m. O₃ Static | 3 p.p.m. O₃ Static |
| 1 | Natural Rubber | 0 | 2.5 | 2.5 | 0.33 | 3 | 1.5 | 0.5 |
| 2 | do | 5 | 2.5 | 2.5 | 0.33 | 3 | 1.5 | 0.5 |
| 3 | do | 15 | 5 | 1 | 0.33 | 5 | 1.5 | 0.5 |
| 4 | do | 25 | 7 | 3 | 1 | 7 | 2 | 0.75 |
| 5 | do | 35 | 11.5 | >1,000 | 10 | 10 | >1,000 | >1,000 |
| 6 | do | 50 | >100 | >1,000 | >1,000 | >500 | >1,000 | >1,000 |
| 7 | SBR-1500 | 0 | 2.5 | 0.75 | 0.5 | 1 | 0.5 | 0.33 |
| 8 | SBR-1500 | 5 | 3.5 | 0.75 | 0.5 | 2 | 0.5 | 0.33 |
| 9 | SBR-1500 | 15 | 4.5 | 1 | 0.5 | 2.5 | 1 | 0.5 |
| 10 | SBR-1500 | 25 | 6.5 | 14 | 1.5 | 3.5 | 7 | 3.5 |
| 11 | SBR-1500 | 35 | 30 | >1,000 | >1,000 | 172 | >1,000 | >1,000 |
| 12 | SBR-1500 | 50 | >270 | >1,000 | >1,000 | >500 | >1,000 | >1,000 |
| 13 | Polybutadiene | 0 | 2 | 2.5 | 0.75 | 1 | 0.5 | 0.33 |
| 14 | do | 5 | 3.5 | 2.5 | 0.75 | 1 | 0.5 | 0.33 |
| 15 | do | 15 | 8.5 | 0.75 | 0.75 | 2 | 0.5 | 0.33 |
| 16 | do | 25 | 1.3 | 3 | 1.25 | 4.5 | 2 | 0.5 |
| 17 | do | 35 | 78.5 | >1,000 | >1,000 | 16 | 22 | 7 |
| 18 | do | 50 | >780 | >1,000 | >1,000 | >440 | >1,000 | >1,000 |
| 19 | AN/BD | 0 | 18 | 3 | 1 | 10 | 2 | 0.5 |
| 20 | AN/BD | 10 | 22 | 3 | 1 | 12 | 2 | 0.5 |
| 21 | AN/BD | 20 | 25 | 2.5 | 0.75 | 17 | 6 | 2 |
| 22 | AN/BD | 30 | 90 | 25 | 6 | 110 | >1,000 | >1,000 |
| 23 | AN/BD | 50 | >90 | >1,000 | >1,000 | >134 | >1,000 | >1,000 |

A. ETHYLENE/1,4-HEXADIENE COPOLYMER—Continued

| | |
|---|---|
| Zinc oxide | 5 |
| Stearic acid | 1 |
| 2,2'-dithiobisbenzothiazole | 1 |
| Zinc dimethyl dithiocarbamate | 2 |
| Sulfur | 1 |

B. NATURAL RUBBER

| Component: | Parts by weight |
|---|---|
| Smoked sheet | 100 |
| Kaolin clay | 100 |
| Zinc oxide | 5 |
| Stearic acid | 2 |
| Antioxidant [1] | 1.5 |
| 2,2'-dithiobisbenzothiazole | 1 |
| Zinc dimethyl dithiocarbamate | 0.25 |
| Sulfur | 2.5 |

[1] 45% by weight 2,6-di-tert-butyl-p-phenylphenol, 45% by weight sorbitol, 10% by weight calcium silicate.

Example 7

Two stocks (A and B) were compounded on a rubber roll mill at 75–100° F. according to the following recipes (parts are by weight):

| Component | Stock A | Stock B |
|---|---|---|
| Ethylene/1,4-hexadiene copolymer (of Example 6) | 100 | 0 |
| SBR-1500 | 0 | 100 |
| Kaolin clay | 120 | 70 |
| Naphthenic petroleum oil | 40 | 10 |
| Stearic acid | 1 | 2 |
| Zinc oxide | 5 | 5 |
| N-phenyl-β-naphthylamine | 1 | 0 |
| Octylated diphenylamine mixture | 0 | 1 |
| Sulfur | 1 | 2 |
| Zinc dimethyl dithiocarbamate | 2.2 | 0 |
| 2,2'-dithiobisbenzothiazole | 0 | 1.5 |
| 2-mercaptobenzothiazole | 0.5 | 0 |
| Copper dimethyl dithiocarbamate | 0 | 0.1 |

A blend was made by mixing 52.5 parts by weight of Stock A and 37.5 parts by weight of Stock B (corresponding to equal weights of ethylene/1,4-hexadiene copolymer and SBR-1500).

The vulcanizates obtained by curing Stock B and the blend for 20 minutes at 320° F. displayed the following ozone cracking behavior:

Ozone cracking resistance
Static test 100 p.p.m. O₃ at 100° F.:
    Stock B _____ Broke in less than 72 hours.
    Blend _____ Uncracked after 200 hours.
Dynamic flexing test 3 p.p.m. O₃ at 100° F.:
    Stock B _____ Cracked in 1.5 hours; broke after 32 hours.
    Blend _____ Uncracked after 209 hours.

As many widely different embodiments of this invention may be made without departing from the spirit and scope thereof, it is to be understood that this invention is not limited to the specific embodiments thereof except as defined in the appended claims.

What is claimed is:

1. A sulfur-curable blend consisting essentially of (a) an amount of an ethylene/1,4-hexadiene copolymer sufficient to impart ozone resistance to the blend and (b) a diene rubber having at least about 20 mol per cent conjugated diene monomer units incorporated therein; said ethylene copolymer having at least about 2.4 gram-moles of C=C groups per kilogram and exhibiting an inherent viscosity of at least 0.1 (measured on a 0.1 percent by weight solution in tetrachloroethylene at 30° C.).

2. A sulfur-curable blend consisting essentially of (a) about 25 to 75 percent by weight of an ethylene/1,4-hexadiene copolymer and (b) about 75 to 25 percent by weight of a diene rubber having at least about 20 mole percent conjugated diene monomer units incorporated therein; said ethylene copolymer having at least about 2.4 gram-moles of C=C groups per kilogram and exhibiting an inherent viscosity of at least 0.1 (measured on a 0.1 percent by weight solution in tetrachloroethylene at 30° C.).

3. The blend of claim 2 wherein the diene rubber is a butadiene-styrene copolymer.

4. The blend of claim 2 wherein the diene rubber is polychloroprene.

5. The blend of claim 2 wherein the diene rubber is a butadiene-acrylonitrile copolymer.

6. The blend of claim 2 wherein the diene rubber is natural rubber.

7. The blend of claim 2 wherein the diene rubber is polybutadiene.

8. A sulfur-curable composition consisting essentially of about 100 parts by weight of a sulfur-curable blend and about 20 to 70 parts by weight of carbon black, said sulfur-curable blend consisting essentially of (a) about 25 to 75 percent by weight of an ethylene/1,4-hexadiene copolymer and (b) about 75 to 25 percent by weight of a diene rubber having at least about 20 mole percent conjugated diene monomer units incorporated therein; said ethylene copolymer having at least about 2.4 gram-moles of C=C groups per kilogram and exhibiting an inherent viscosity of at least 0.1 (measured on a 0.1 percent by weight solution in tetrachloroethylene at 30° C.).

9. A sulfur-curable composition consisting essentially of about 100 parts by weight of a sulfur-curable blend and about 80 to 200 parts by weight of mineral filler, said sulfur-curable blend consisting essentially of (a) about 25 to 75 percent by weight of an ethylene/1,4-hexadiene copolymer and (b) about 75 to 25 percent by weight of a diene rubber having at least about 20 mole percent conjugated diene monomer units incorporated therein; said ethylene copolymer having at least about 2.4 gram-moles of C=C groups per kilogram and exhibiting an inherent viscosity of at least 0.1 (measured on a 0.1 percent by weight solution in tetrachloroethylene at 30° C.).

10. A sulfur-curable composition consisting essentially of about 100 parts by weight of a sulfur-curable blend and about 1 to 300 parts by weight of a petroleum oil having a flash point of at least about 300° F. and a viscosity-gravity constant of about 0.8 to 1.0, said sulfur-curable blend consisting essentially of (a) about 25 to 75 percent by weight of an ethylene/1,4-hexadiene copolymer and (b) about 75 to 25 percent by weight of a diene rubber having at least about 20 mole percent conjugated diene monomer units incorporated therein; said ethylene copolymer having at least about 2.4 gram-moles of C=C groups per kilogram and exhibiting an inherent viscosity of at least 0.1 (measured on a 0.1 percent by weight solution in tetrachloroethylene at 30° C.).

11. The composition of claim 10 containing about 20 to 70 parts by weight of carbon black per 100 parts by weight of sulfur-curable blend.

12. The composition of claim 10 containing about 80 to 200 parts by weight of mineral filler per 100 parts by weight of sulfur-curable blend.

13. The vulcanizate obtained by curing the blend of claim 1 with sulfur.

14. The vulcanizate obtained by curing the composition of claim 8 with sulfur.

15. The vulcanizate obtained by curing the composition of claim 9 with sulfur.

16. The vulcanizate obtained by curing the composition of claim 10 with sulfur.

References Cited by the Examiner

UNITED STATES PATENTS

| | | | |
|---|---|---|---|
| 2,933,480 | 4/1960 | Gresham et al. | 260—80.5 |
| 3,000,866 | 8/1961 | Tarney | 260—80.5 |
| 3,136,739 | 6/1964 | Adamek et al. | 260—889 |

FOREIGN PATENTS

| | | |
|---|---|---|
| 624,563 | 7/1961 | Canada. |

MURRAY TILLMAN, *Primary Examiner.*